United States Patent [19]

Koppens

[11] 4,207,654
[45] Jun. 17, 1980

[54] DEVICE FOR PREPARING COHERENT PRODUCTS FROM DEFORMABLE FOODSTUFFS

[75] Inventor: Wilhelmus F. A. Koppens, Bakel, Netherlands

[73] Assignee: Koppens Machinefabriek B.V., Bakel, Netherlands

[21] Appl. No.: 912,187

[22] Filed: Jun. 5, 1978

Related U.S. Application Data

[62] Division of Ser. No. 776,226, Mar. 10, 1977, abandoned.

[30] Foreign Application Priority Data

Mar. 12, 1976 [NL] Netherlands .......................... 7602595
Nov. 12, 1976 [NL] Netherlands .......................... 7612573

[51] Int. Cl.² ................................................ A22C 7/00
[52] U.S. Cl. .......................................... 17/32; 17/1 R
[58] Field of Search ............................ 17/1 R, 1 S, 32

[56] References Cited

U.S. PATENT DOCUMENTS

| | | | |
|---|---|---|---|
| 3,213,486 | 10/1965 | Blake | 17/1 R |
| 3,386,129 | 6/1968 | Holly | 17/32 |
| 3,405,422 | 10/1968 | Seco et al. | 17/1 S |
| 3,724,026 | 4/1973 | Gernandt | 17/1 R |
| 3,765,056 | 10/1973 | Holly | 17/32 |

Primary Examiner—Z. R. Bilinsky
Attorney, Agent, or Firm—Omri M. Behr

[57] ABSTRACT

There is provided a device for preparing coherent materials from deformable foodstuffs, for example, ground meat. Said device comprising a foodstuff bunker and an apertured plate to form the coherent products in the apertures, said bunker culminating at least one pushing member for pushing the foodstuff out of the bunker.

7 Claims, 6 Drawing Figures

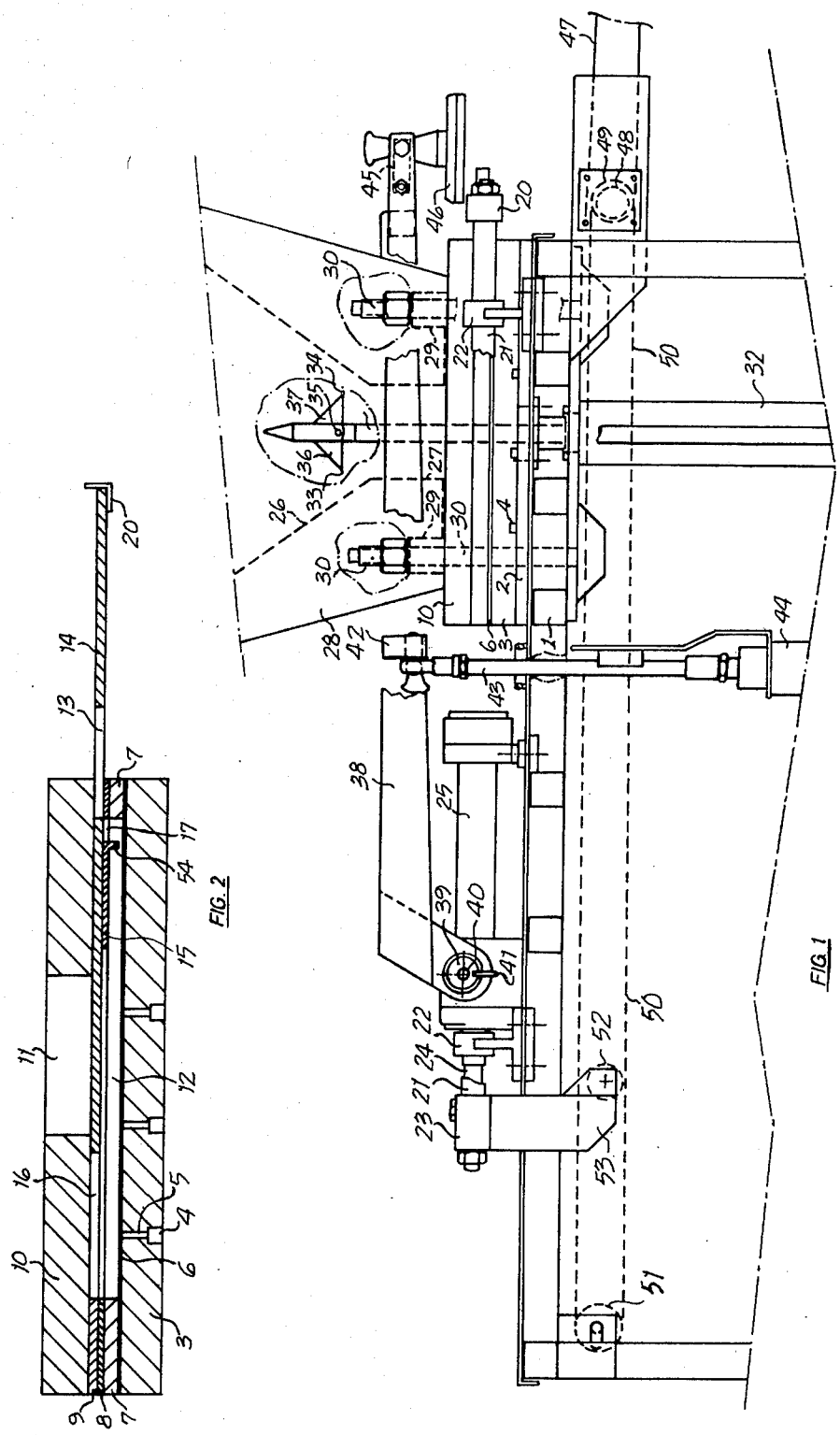

DEVICE FOR PREPARING COHERENT PRODUCTS FROM DEFORMABLE FOODSTUFFS

This is a division, of application Ser. No. 776,226, filed Mar. 10, 1977, now abandoned.

DESCRIPTION OF THE PRIOR ART

In known devices of the kind set forth further pressing members, apart from the pushing member in the bunker, are generally required for pushing the foodstuff into the moulding plate whilst various changes of direction are carried out. This involves not only a complicated construction of the device, but also an undesirable action on the material, since this is heavily subjected to pressure variations, which may result, for example, in an undesirable disintegration of the mixture and/or damage of the material.

SUMMARY OF THE INVENTION

The invention has for its object to provide a simple and effective device of the kind set forth, in which the disadvantages inherent in the conventional devices are avoided at least partly.

According to the invention this can be achieved by providing directly beneath the bunker a space accommodating the moulding plate, in which the plate can receive foodstuff in the apertures, whereas the side of said space remote from the bunker is bounded by a plate having passages establishing an open communication between said space and the atmosphere. Thus an undesirable change in pressure in the space beneath the bunker, which adversely affects the operation of the device, can be avoided, whilst the material can be inserted along a short path into the apertures of the plate without the use of additional, movable pressing members between the bunker and the apertured plate.

A particularly simple embodiment is obtained by constructing the device so that the material can be directly conveyed from the bunker into the apertures, whilst the air can escape through the passages.

According to a further feature the invention relates to a device for threading lumps of foodstuff on sticks, particularly bits of meat.

It has hitherto been common practice to thread bits of food, for example, lumps of meat by hand on sticks for preparing "sate".

This is particularly costly in labour and hazardous in wounding, whilst difficulties are involved in respect of hygiene.

The invention has for its object to provide a device for carrying out these operations mechanically.

According to the invention this can be achieved by means of a device for threading lumps of foodstuff on sticks, particularly lumps of meat, comprising a stock trough for sticks having a slotted bottom plate fitting a stick, the slot holding a displaceable pin for displacing the stick to penetrate the lump, whilst near the slot a rod of curved cross-section extends parallel to the slot and is lying loosely on the bottom plate so that the rod can shift in place transversely of its direction of length with respect to the slot, there being provided means for causing the bottom plate and/or said rod to reciprocate transversely of the direction of length of the slot.

By providing the rod loosely bearing on the bottom plate and by vibrating the bottom plate and/or the rod it is ensured that a stick is invariably pressed in the desired manner into the slot, even if the stick is not absolutely straight, the stick being pressed by the rod into the slot so that it can be shifted without disturbance by the pin into the foodstuff.

BRIEF DESCRIPTION OF THE DRAWINGS

The invention will now be described more fully with reference to a few embodiments shown schematically in the accompanying Figures for constructions in accordance with the invention.

FIG. 1 is a schematical partial side elevation and a partial sectional view of an embodiment of the device in accordance with the invention.

FIG. 2 is a sectional view of the pressure chamber of the device shown in FIG. 1 and the plate adapted to reciprocate therein.

DESCRIPTION OF THE PREFERRED EMBODIMENTS

Figure 3:
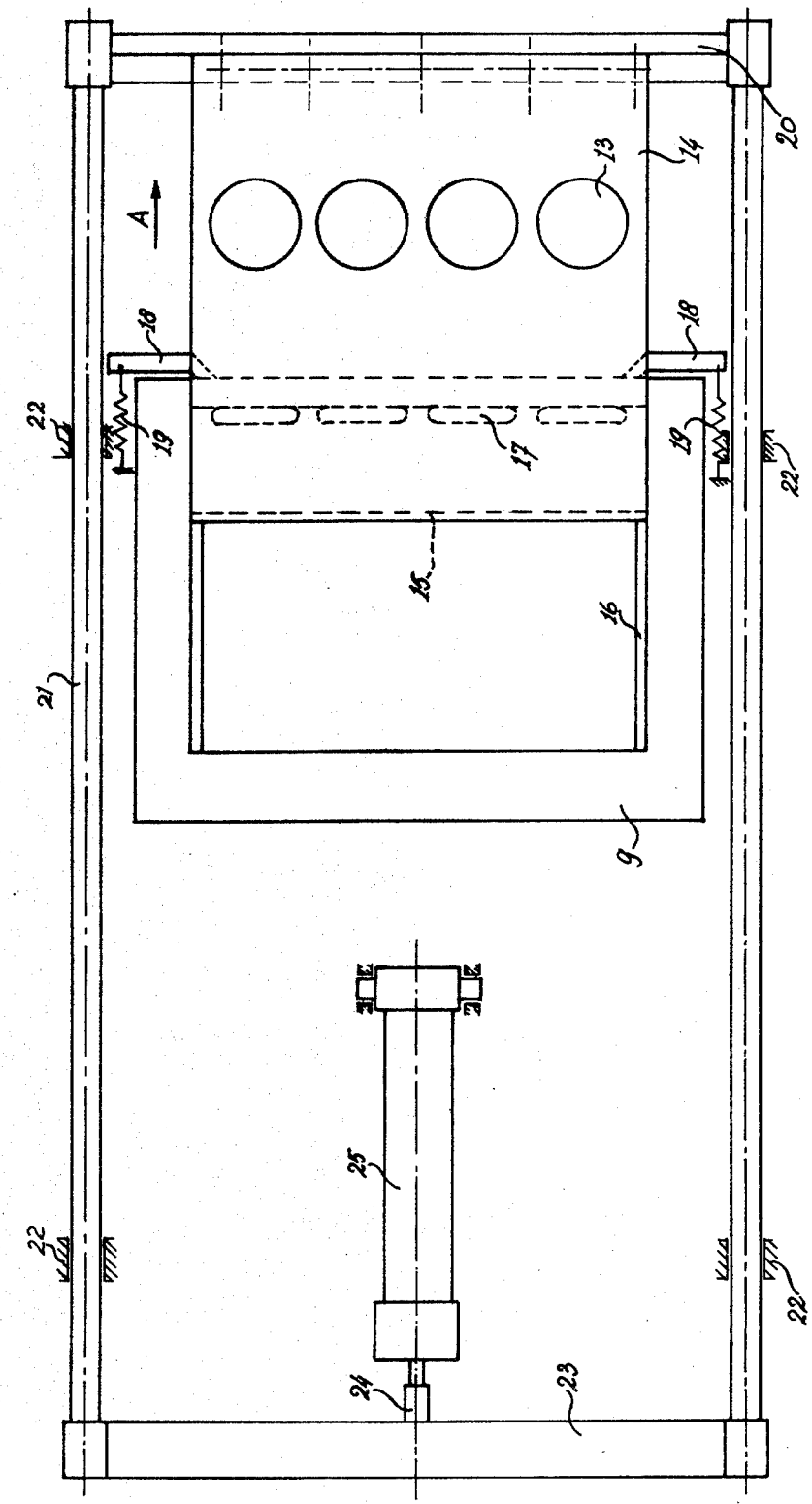
FIG. 3 is a schematic plan view of part of the pressure chamber and of the driving mechanism for the apertured plate adapted to reciprocate in the pressure chamber.

The device shown in FIG. 1 comprises a frame 1 of beams and the like, on which a closed plate 2 is held. The closed plate 2 supports a plate 3 having transverse grooves 4 on the bottom side, communicating with a plurality of vertical bores 5 extending up to the top side of the plate 3. A diaphragm 6 of flexible material is bearing on the plate 3. The diaphragm 6 is clamped at its periphery to the plate 3 by means of a fillet 7. The fillet 7 supports a corresponding thinner fillet 8, on which a fillet 9 is disposed. The fillet 9 has a cover plate 10 having a passage 11. The diaphragm 6, the fillets 7, 8 and 9 and the plate 10 define a pressure chamber 12.

Along the bottom side of the plate 10 is adapted to reciprocate a moulding plate 14 having apertures 13 and projecting out of the pressure chamber through an opening in the fillet 9.

Beneath the plate 14 is located a smaller plate 15, which is adapted to reciprocate in the same direction as the plate 14. The plate 15 is held by grooves 16 in the fillet 7.

In the position of the plate 15 shown in FIGS. 1 and 3 the right-hand end of the plate 15, as seen in the Figures, is coplanar with the right-hand ends of the plate 10 and the fillets 7 to 9. The slots 17 in the plate 15 are located just at the side of the fillet 7 so that they freely communicate with the pressure chamber 12. From FIG. 3 it will be apparent that the number of slots 17 is equal to the number of apertures 13 and in the direction of displacement of the plate 14 (arrow A) they are located one behind the other.

The plate 15 is provided with protruding ears 18, with which are coupled the ends of springs 19. The other ends of the springs 19 are anchored on the frame. The springs 19 tend to hold the plate 15 in the position shown in the Figures.

To the end of the plate 14 located outside the pressure chamber is secured a transverse beam 20, the ends of which are provided with rods 21. The rods 21 extend on either side of the block accommodating the pressure chamber and are guided by supports 22 secured to the frame.

The ends of the rods 21 remote from the beam 20 are interconnected by a beam 23. Midway between the rods 22 the beam 23 has secured to it the end of a piston rod 24 of a setting cylinder 25 connected with the frame.

On the plate 10 is disposed a bunker comprising two downwardly inclined and converging plates 26, the lower ends 27 of which are parallel to one another, and two flat, upwardly extending plates 28, which extend parallel to the direction of movement of the plate 14. From FIG. 1 it will be seen that the plates 28 are prolonged beyond the plates 26 and the beams 29 are arranged between the portions of the plates 28 extending beyond the plates 26.

Bolts 30 are passed through holes in the frame 1, the plates 2 and 3, the fillets 7, 8, 9, the plate 10 and the beams 29, said parts being clamped together and to the frame 1 with the aid of said bolts 30.

On each side of the pressure chamber two shafts 31 extend vertically upwards, the top ends of said shafts being located inside the bunker near the sidewalls 28. The lower ends of the shafts are connected with a setting cylinder 32 incorporated in the frame so that the shafts 31 can be moved up and down by means of the setting cylinder 32.

Between the shafts are arranged two plates 33 and 34 extending perpendicularly to the plane of the drawing. The proximal edges of said plates are pivoted to the shafts 31 with the aid of a pivotal shaft 35 extending parallel to the direction of length of the plates 33 and 34.

Above the plates 33 and 34 the shafts 31 are provided with stops 36 and 37, which limit the upward movement of the plates 33 and 34 out of the horizontal position shown in FIG. 1. A spring (not shown) tends to hold the plates 33 and 34 in the position shown in FIG. 1.

On each side of the bunker extend two arms 38, each of which is adapted at one end to rotate about a shaft 39, which is rotatably journalled in the frame with the aid of stubs 40, arranged eccentrically to the centre line of the shaft 39. The shaft 39 has fastened to it an arm 41, with the aid of which the shaft 39 can turn about the centre lines of the stubs 40 with respect to the frame. Fixing means (not shown are arranged for fixing the shaft 39 in an opposite position.

The two arms 38 are interconnected by a transverse beam 42, which is coupled with the piston rod 43 of a setting cylinder 44 secured to the frame, with the aid of which the arms 38 can be turned about the shaft 39.

The free ends of the arms 38 hold between them a transverse beam 45, with which pressure dishes 46 are coupled, whose number and positions match the number and positions of the openings 13 in the plate 14.

The device furthermore comprises a conveying member formed by an endless conveyor belt 47, which is guided near its end located beneath the pressure plate 46 around a reversing roller 48, with which is connected a chain sprocket 49. A chain 50 is passed around the sprocket 49 and is guided near the other end of the device around a chain sprocket 51 which can be shifted in place in the direction of length of the chain and which is supported by the frame.

The lower run of the chain 50 is engaged by a chain sprocket 52, which is rotatably supported by a support 53 connected with the beam 23 interconnecting the two rods 21. The chain sprocket 52 is supported so that the sprocket can roll along the lower run of the chain 50 only when the chain sprocket 52 is displaced to the right in FIG. 1, whereas at a displacement to the left in FIG. 1 the chain sprocket 52 is blocked so that the teeth of the sprocket 52 carry along the lower run of the chain 50 to the left.

The device described above operates as follows.

Initially the plate 14 with the apertures 13 will occupy such a position that, as seen in FIG. 2, the plate 14 is located completely to the right of the opening 11. In this position of the plate 14 the rods 31 with the plates 33 and 34 fastened thereto will move downwards so that the mass of foodstuff, for example, ground meat, is pressed downwards to form so-called "Hamburgers", the mass being compressed in the pressure chamber 12. Subsequently, the plate 14 will be displaced to the left in FIG. 2 with the aid of the setting cylinder 25, whilst initially the quantity of material displaced by the plate 14 in the pressure chamber, which quantity is comparatively very small, will be urged back at least partly into the return opening 11 to the bunker. However, at a given instant the plate 14 will completely close the opening 11 and when the plate is then moved on over a small distance, the apertures 13 in the plate come into communication through the slotshaped holes 17 with the interior of the pressure chamber 12. During the further displacement of the plate 14 to the left in FIG. 2, during which the material contained in the pressure chamber 12 is additionally compressed by the plate 14 slipped into the pressure chamber 12, the apertures 13 will be gradually filled via the openings 17, whilst the air of the openings 13 can escape from the material pressed into the apertures 13.

At the instant when the apertures 13 are completely located beneath the plates 10, the apertures will be filled substantially completely.

From the foregoing it will be apparent that during this displacement of the plate 14 the chain 50 is driven by the chain sprocket 52, as a result of which also the upper run of the endless conveyor belt 47 is displaced to the right over a given distance.

Subsequently the plate 14 is again moved to the right with the aid of the setting cylinder 25 into the position in which the passage 11 is again in open communication with the pressure chamber. During the right-hand displacement of the plate 14 the plate 15 is carried along to the right owing to the friction between the plates 15 and 14 against the action of the springs 19 so that the openings 17 arrive above the fillet 7, the communication between the pressure chamber and the apertures 13 in wich the products are formed being closed so that the material cannot flow back out of the apertures 13.

When the plate 14 moves back out of the pressure chamber, a certain amount of subatmospheric pressure could be produced in the pressure chamber. This is prevented since at the occurrence of a subatmospheric pressure the flexible plate 6 is pressed upwards by the open air flowing in through the channels 4 and the bores 5 so that the material contained in the pressure chamber is constantly subjected to pressure. When the passage between the inlet opening 11 and the pressure chamber 12 is re-established, new material can again be pressed with the aid of the plates 33 and 34 in the manner described above into the pressure chamber 12.

The plate 14 is displaced sufficiently to the right in the Figures to position the apertures 13 opposite the pushing members 46. Then the pushing members are moved downwards by the pivotal movement of the arms 38 with the aid of the setting cylinder 44. The correct position of the pushing members 46 with respect to the apertures 13 in the extreme right-hand position of the plate 14 can be adjusted by turning the shaft 39 about the stud 40 located eccentrically to the centre line of the shaft 39. Such a turn of the shaft 39 will result in a horizontal displacement of the pushing members 46.

With the aid of the pushing members 46 the formed products are pressed out of the apertures 13 and disposed on the endless conveyor belt 47. Subsequently the arms 38 are turned upwards with the aid of the setting cylinder 44 and the plate 14 can then again be slipped into the pressure chamber 12 so that the cycle described above is repeated. During this displacement of the plate 14 the conveyor belt 47 is driven by the chain 50 so that the products lying thereon are conducted away.

In some cases it is desirable to stack a plurality of products on the conveyor belt 47. In this case paper sheets will be interposed between the various products, which sheets can be readily advanced since the products lying on the conveyor belt 47 are readily accessible beneath the expelling members 46.

If it is desired to pile up a plurality of products on the conveyor belt 47, the conveyor belt 47 can be prevented from being driven at every reciprocatory stoke of the plate 14, a blocking member actuated electrically or pneumatically can be connected with the sprocket 52, which can thus be prevented from rotating. This blocking member may be adjusted so that during a given number of reciprocatory movements of the plate 14 the chain sprocket 52 remains blocked and after this given number the blocking member is released for driving the chain and hence the conveyor belt 47 during a reciprocatory movement of the plate 14. Then the chain sprocket 52 is again retained during a plurality of reciprocatory strokes of the plate 14 corresponding to the number of products to be piled up. It should be noted that the plate 15 is provided with a stop 54, which limits the right-hand movement of the plate 15.

Figure 4:
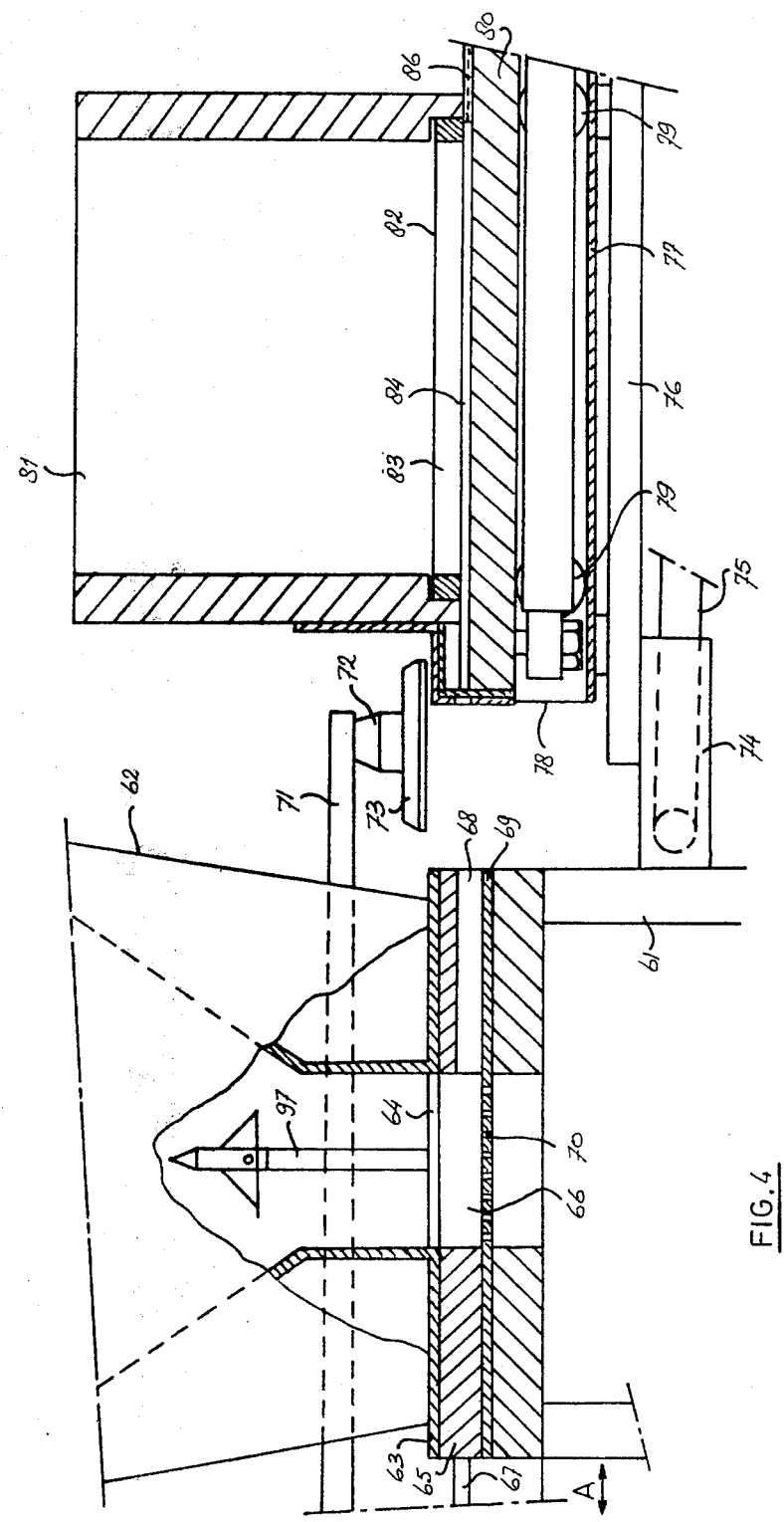
FIG. 4 shows schematically part of a further device in accordance with the invention, partly in an elevational view and partly in a sectional view.

The device shown in FIG. 4 comprises a frame 61 with a stock bunker 62 containing foodstuffs, for example, meat. The bunker 62 has a bottom plate 63 having a central opening 64. Beneath the bottom plate 63 a moulding plate 65 has a plurality of apertures 66, which are located one behind the other as shown in FIG. 4. To the molding plate 65 is fastened the end of a piston rod 67 of a setting cylinder (not shown) fastened to the frame 61, with the aid of which the moulding plate 65 can be reciprocated in the direction of the arrow A.

The apertures 66 preferably have an elongated shape, the long side of the aperture 66 being parallel to the direction of displacement indicated by the arrow A. From FIG. 4 it will furthermore be apparent that each elongated aperture 66 communicates with an open groove 68 in the straight portion of the plate 65, the width of said groove being approximately equal to the thickness of a stick normally used for picking meat. Beneath the plate 65 is located a plate 69 supported by the frame. Those portions of the plate 69 which are located opposite the apertures 66 of the plate 65 in the position of the plate 65 shown in FIG. 4, have a large number of apertures 70 of small diameter. For the sake of clarity the apertures are shown in the Figures with an excessive diameter.

The device comprises furthermore two arms 71 located one on each side of the bunker 62, said arms being in common pivotable about a shaft (not shown) located on the left-hand side of the bunker 62 (see FIG. 4) with the aid of a setting cylinder (not shown), for example, in the manner described for the preceding embodiment. Between the two arms 71 a carrier 72 is provided with expelling members 73. The number, the disposition and the shape of the expelling members is such that when the moulding plate 65 is shifted to the right with the aid of the piston rod 67 (see FIG. 4) into a position in which the apertures 66 of the plate 65 are located beneath the expelling members, the latter can be pressed into the apertures 66 by the downward turn of the arms 71 so that the material located in the pertures 66 is slipped out of said apertures.

On the right-hand side of the frame supports 74 are provided for holding the end of an endless conveyor belt 75. An auxiliary frame 76 is fastened with the aid of fastening members (not shown) to the supports 74 so as to be readily detachable. The auxiliary frame 76 is provided with a horizontal plate 77, the ends 78 of which are twice bent over at right angles to form U-shaped guides. To the upwardly bent-over ends 78 of the plate 77 are fastened a plurality of rollers 79 adapted to rotate about horizontal shafts and supporting a plate 80 so that the plate 80 can shift to and fro along the rollers in the direction of the arrow A.

Near one end a stock trough 81 is fastened to the plate 80. The lower ends of the sidewalls of the stock trough 81 extending at right angles to the direction of displacement have grooves receiving a plate-shaped slide 82 so that it is displaceable transversely of the direction of displacement of the plate 80.

The plate-shaped slide 82 has a plurality of elongated slots 83, whose direction of length extends in the direction of displacement of the plate 80. At the level of each slot 83 the top surface of the plate 80 has a slot 84, the section of which is such that a conventional stick for threading meat is fitting in it. Each slot 83 has a round rod 85 so that the centre line of the rod 85 is parallel to the direction of displacement of the plate 80. From FIG. 6 it will be apparent that the rod 85 has a certain amount of clearance in the slot 83 so that the rod 85 can roll to and fro about its axis in the slot 83 concerned.

Figure 5:
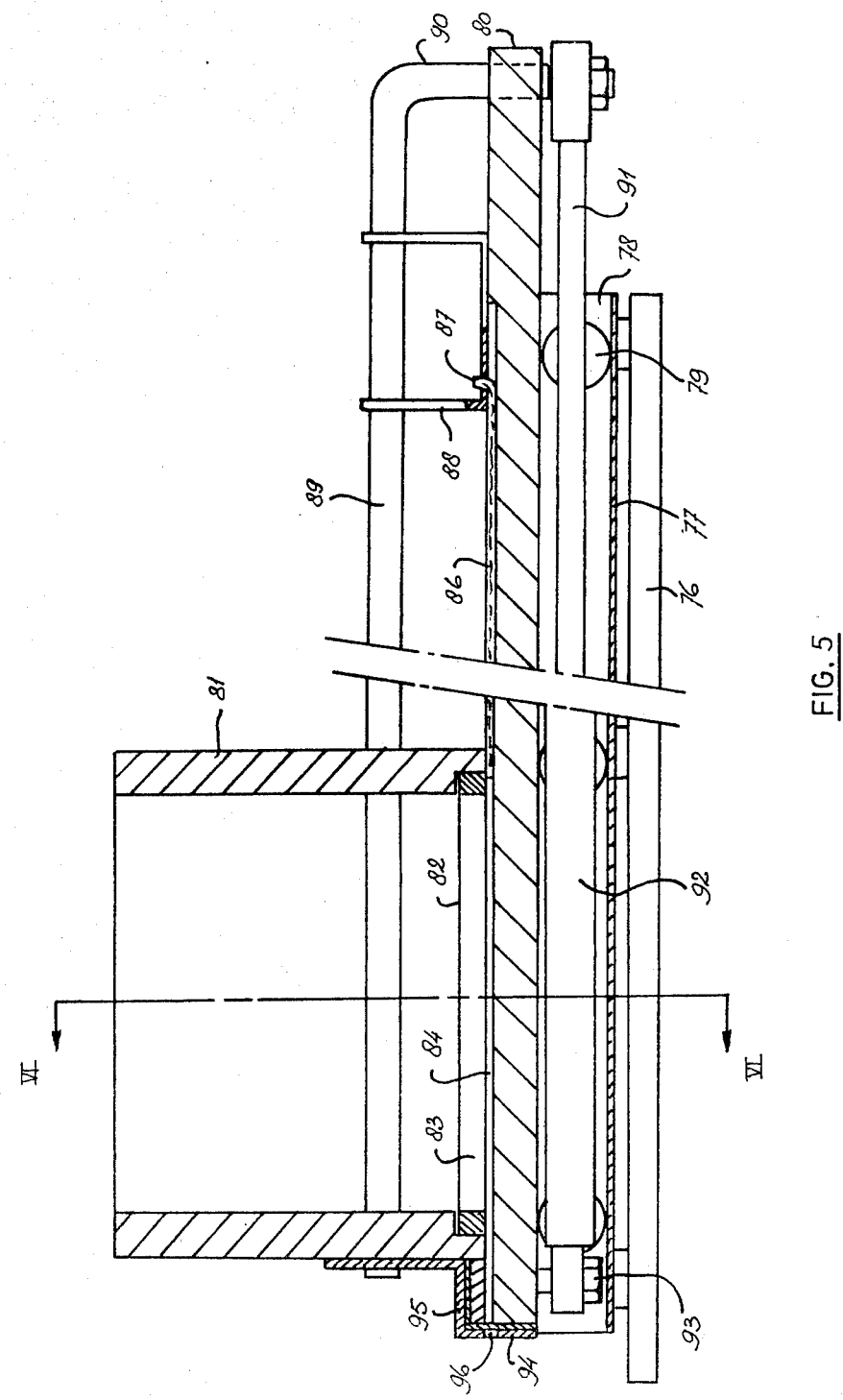
FIG. 5 is partly a sectional view and partly an elevational view of the mechanism displacing the sticks used in the device shown in FIG. 4.

FIG. 5 shows that each slot 84 contains a pin 86, whose end remote from the stock trough 81 is bent over upwards and is coupled with a bracket 88, which is secured to a rod 89 extending parallel to the direction of displacement of the plate 80.

At one end the rod 89 is guided by holes in the walls of the trough 81, whereas the other end 90 of the rod 89 is bent over downwards at right angles and is secured to one end of a piston rod 91 of a setting cylinder 92. The end of the setting cylinder 92 remote from the piston rod 91 is secured to the plate 80 by means of a bolt 93. The bent-over end 90 of the rod 89 is located in an elongated hole in the plate 80, covering an appropriate distance in the direction of displacement of the plate 80.

To the end of the plate 80 facing the moulding plate is clamped a strip 94 of flexible material with the aid of a clamping plate 95. At the level of each slot 84 the flexible material 94 has a cross-shaped incision and at the level of each slot 80 in the plate 95 a passage 96 is provided.

Spring means arranged between the plate 80 and the auxiliary frame 76 tend to hold the plate 80 in the position shown in the FIG. 4 so that the plate 80 can be shifted to the right in FIG. 4 against the action of said spring means (not shown).

Figure 6:
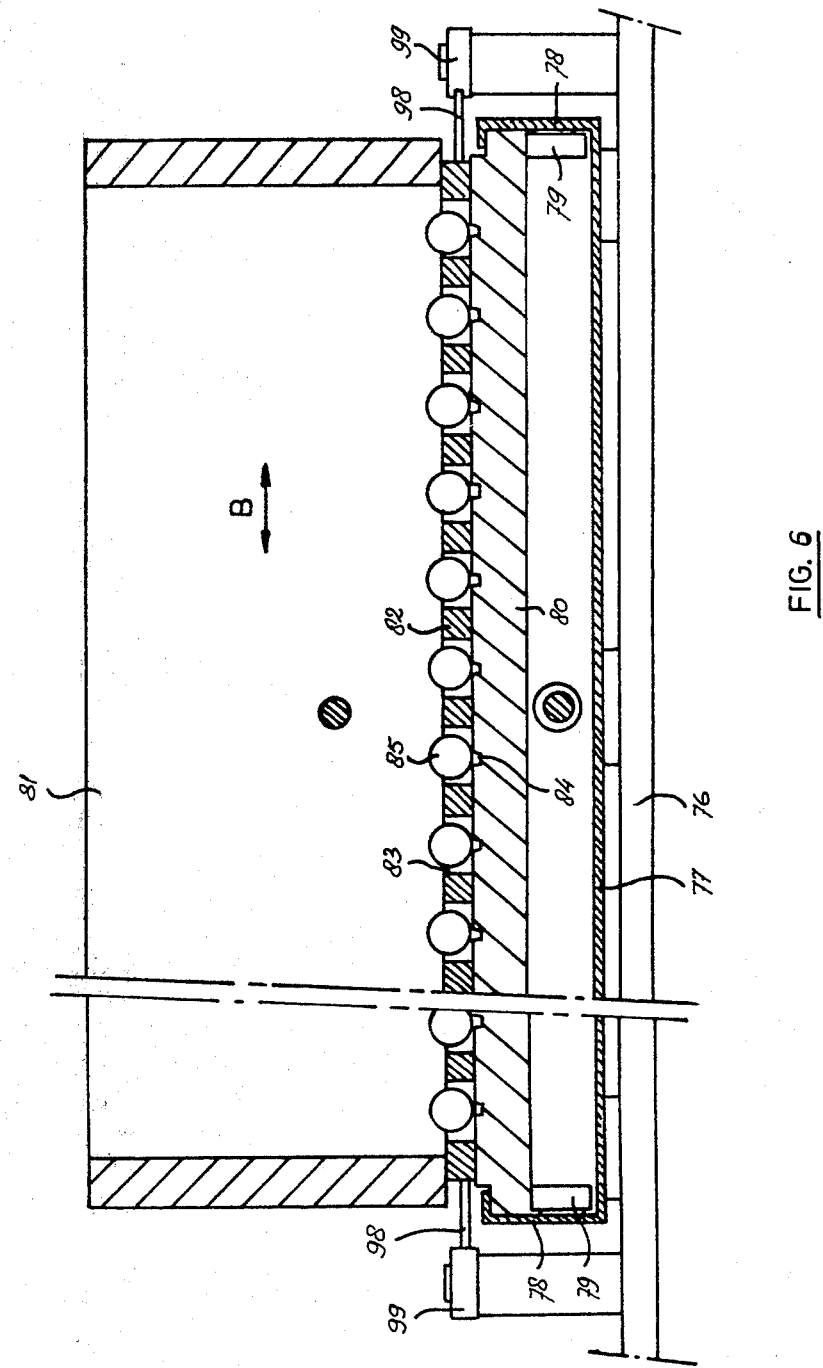
FIG. 6 is a cross-sectional view of the mechanism of FIG. 5 taken on the line VI—VI in FIG. 5.

The device shown in FIGS. 4 to 6 operates as follows. With the aid of a driving mechanism (not shown) a pressing member 97 located inside the bunker 82 and constructed and driven in a manner similar to the first embodiment can be moved up and down. During the downward movement the pressing member 97 will press the foodstuff in the bunker 82, for example, lumps of meat, into the elongated apertures 65 of the plate. Any air contained in the material can escape through the openings 70, which have such a small cross-section that the material will not be pressed into said openings.

After the apertures 66 have been filled with the foodstuff, the plate 65 is displaced to the right in FIG. 4 with the aid of the piston rod 67. At a given instant the apertures 66 will be located between the right-hand ends of the plates 63 and 69 so that the apertures 66 are closed on all sides. At this instant the right-hand end of the plate 65 will be urged against the plate 95 fastened to the plate 80, whilst an opening 96 will be located opposite each slot 68. As the case may be, the plate 80 is already shifted slightly to the right. At this instant the setting cylinder 92 will also become operative. By means of the setting cylinder 92 the pins 86 are displaced to the left in FIG. 5, so that the pins will advance the sticks located in the slot, the sticks thus moving through the openings formed by the cross-shaped incisions in the plate 94, the openings 96, the slots 68 down to the lumps of foodstuff in the apertures 66. This may occur when the plate 65 is standing still and when it slowly advances to the right in FIG. 4.

Then the pins 86 are returned by the setting cylinder 92 to the position shown in FIG. 5 and at the same time the plate 65 is displaced further to the right by means of the piston rod 67, the plate 80 being urged also to the right by the plate 65 until the plate 65 is in a position in which the apertures 66 are located beneath the expelling members 73. At this instant the expelling members 73 are moved downwards and the lumps of foodstuff are pressed out of the apertures 66 downwards to drop on the conveyor belt 75, which conveys them to a packing machine or the like. During the expulsion the sticks can move freely downwards through the slots 78 open on the bottom side in the moulding plate 65.

After the lumps of foodstuff have been pressed out of the apertures 66, the expelling members 73 are again moved upwards, after which the plate 65 is withdrawn by the piston rod 67 towards the position shown in FIG. 4. The plate 80 follows said plate to the left in FIG. 4 until the plate 80 regains the position shown in FIG. 4.

During this reciprocatory movement of the plate 80 and of the stock trough 81 fastened thereto, which contains a stock of sticks, the members 98 (see FIG. 6) fastened to the plate-shaped slide 82 are displaced with respect to rollers 99 fastened to the auxiliary frame 76 and adapted to rotate freely about rotary shafts extending vertically upwards (99). The rollers 99 are in contact with the sides of the ears 98, which have a corrugated shape. Therefore the displacement of the ears 98 with respect to the rollers 99 will result in a reciprocatory movement in the arrow B of the plate-shaped slide transversely of the direction of length of the slots 83 and the direction of length of the rollers 85. Thus the rollers 85 will roll along the plate forming a bottom plate for the bunker 81, whilst the sticks in the bunker extending parallel to the rollers 85 are also caused to move. This movement ensures a satisfactory feed of sticks into the slots 84, the rollers 85 ensuring that a stick is pressed into each slot in due time; in practice it has been found that even in the case of a deviation from the straight shape the sticks are nevertheless effectively pressed into the slots 84 by the rollers 85. The rollers always tend to bear on a slot so that a stick located in a slot 84 will always be pressed by a roller 85, so that it can be displaced without disturbance with the aid of a pin 86.

I claim:

1. In an apparatus for the threading of a lump of foodstuffs, the improvement comprising:
    (a) a stick feeder trough;
    (b) a bottom plate located under said stick feeder trough and having at least one slot therein for receiving a stick;
    (c) a pin slidably received in said slot and cooperating therewith for displacing said stick so as to cause it to penetrate said foodstuff;
    (d) at least one rod disposed proximate said slot and parallel thereto, said rod having a curved cross-section with its periphery being in intimate frictional contact with said bottom plate; and,
    (e) means for reciprocating said bottom plate in a direction transverse to the long dimension of said rod for causing said rod to rotate in place.

2. The apparatus of claim 1 further including:
    (a) a molding plate having an opening therein; said molding plate being fillable from a foodstuff feeder hopper in a first position, said molding plate being movable into a second position completely closing said opening with said foodstuff therein and said molding plate being movable into a third position;
    (b) means for inserting said stick of material into said foodstuff in said second position; and
    (c) means for pressing out of said opening said foodstuff with said stick therein in said third position.

3. The apparatus of claim 2 wherein said molding plate is provided with a plurality of slots therein, each said slot being adapted to receive a stick therein and said molding plate abutting against said bottom plate to form an uninterrupted passage for said stick.

4. The apparatus of claim 3 wherein the bottom plate of said apparatus is movable in the direction of said molding plate.

5. The apparatus of claim 4 further including:
    a plate-shaped slide supported by said bottom plate, said plate-shaped slide having a number of elongated holes corresponding with the number of slots in said bottom plate, said elongated holes adapted for receiving rods with sufficient clearance in said elongated hole to enable said sticks to pass therearound.

6. The apparatus of claim 5 further including:
    means for reciprocating said plate-shaped slide.

7. The apparatus of claim 6 wherein said plate-shaped slide is provided with a pair of ears disposed proximate two opposite corrugated edges and a pair of roller means for reciprocating said plate-shaped slide when said bottom plate is displaced by said molding plate.

* * * * *